Nov. 24, 1931.　　　　F. O. TAYLOR　　　　1,833,447
SEED CLEANER AND GRADER
Filed Jan. 12, 1929　　　6 Sheets-Sheet 4
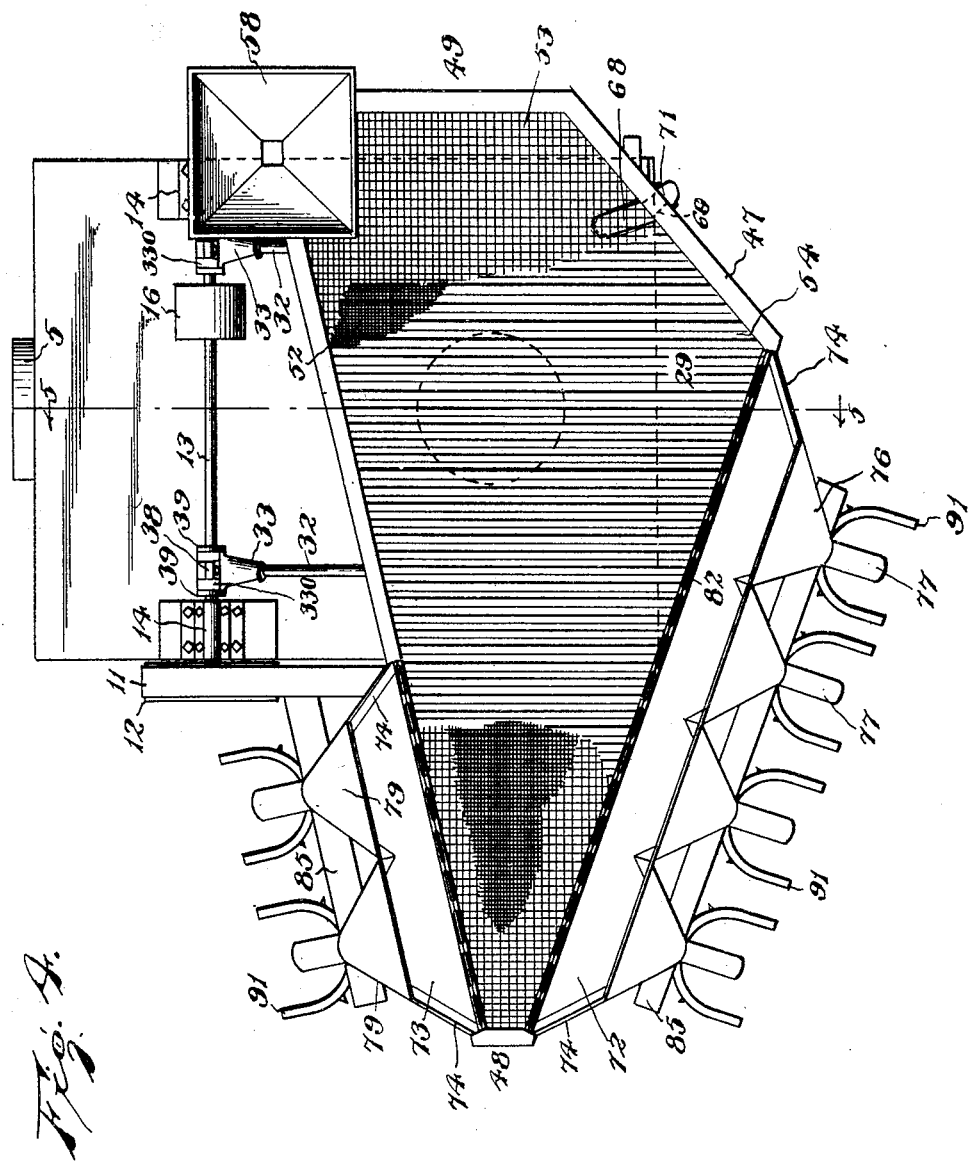
Inventor
F. O. Taylor
By Lacey & Lacey, Attorneys

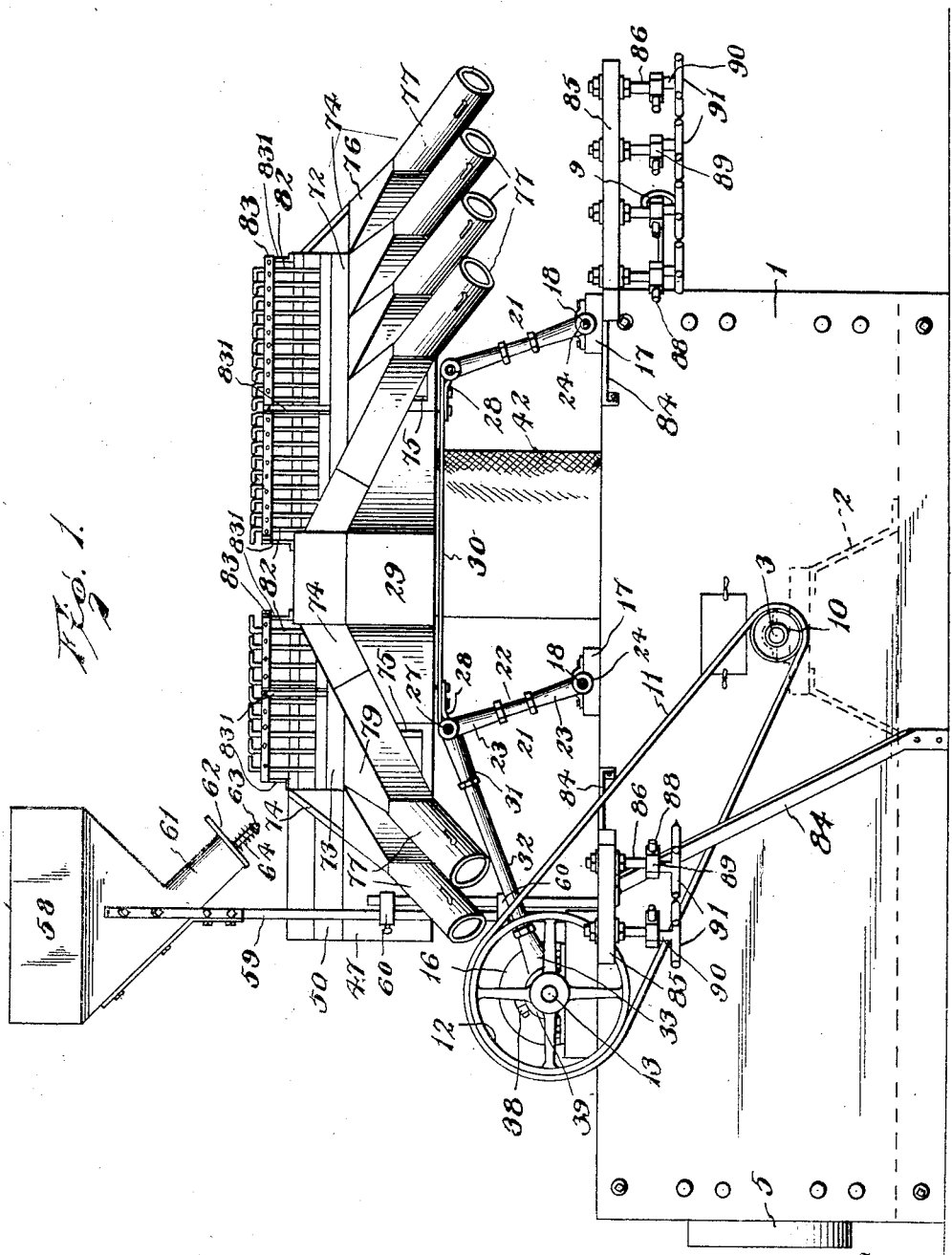

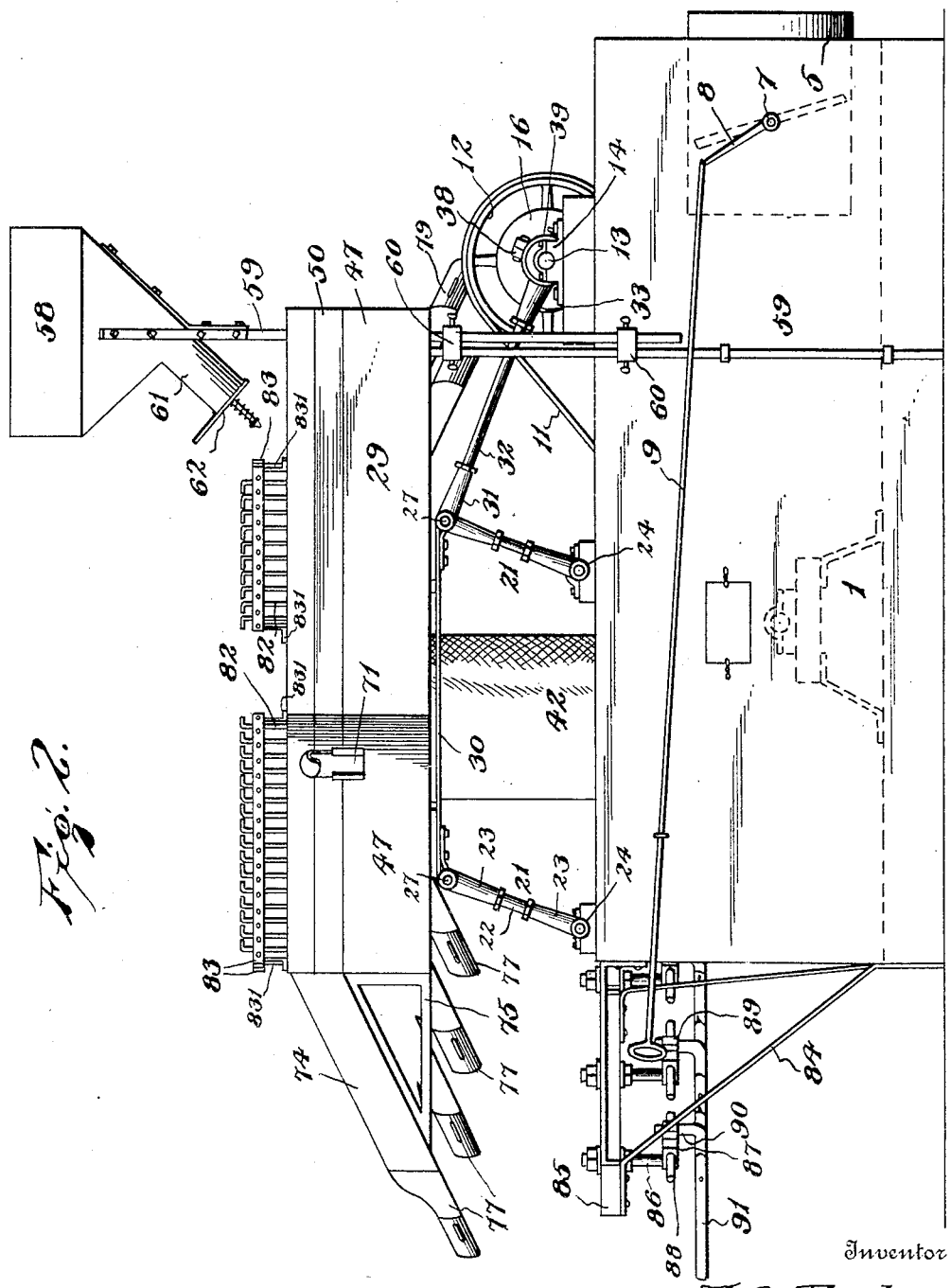

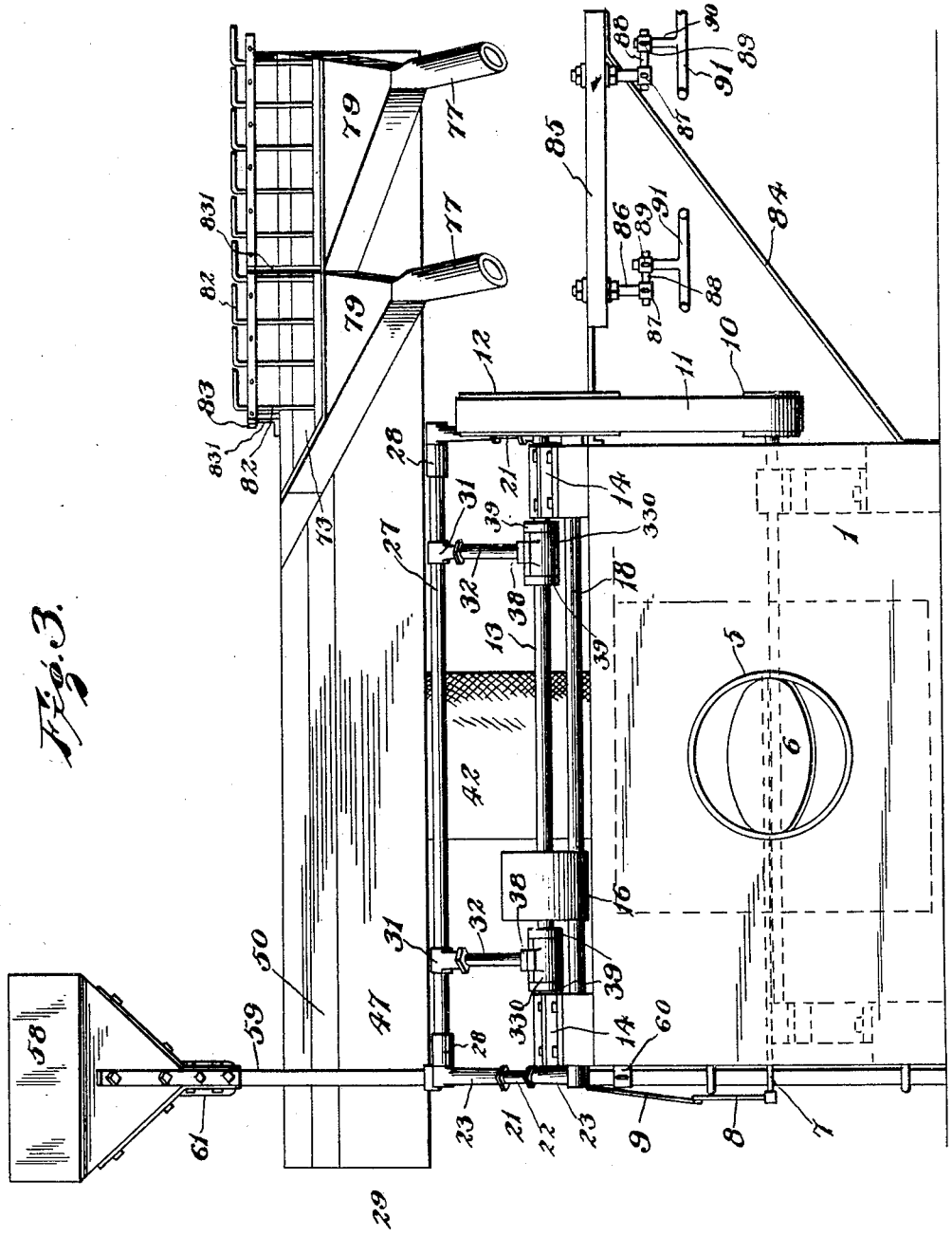

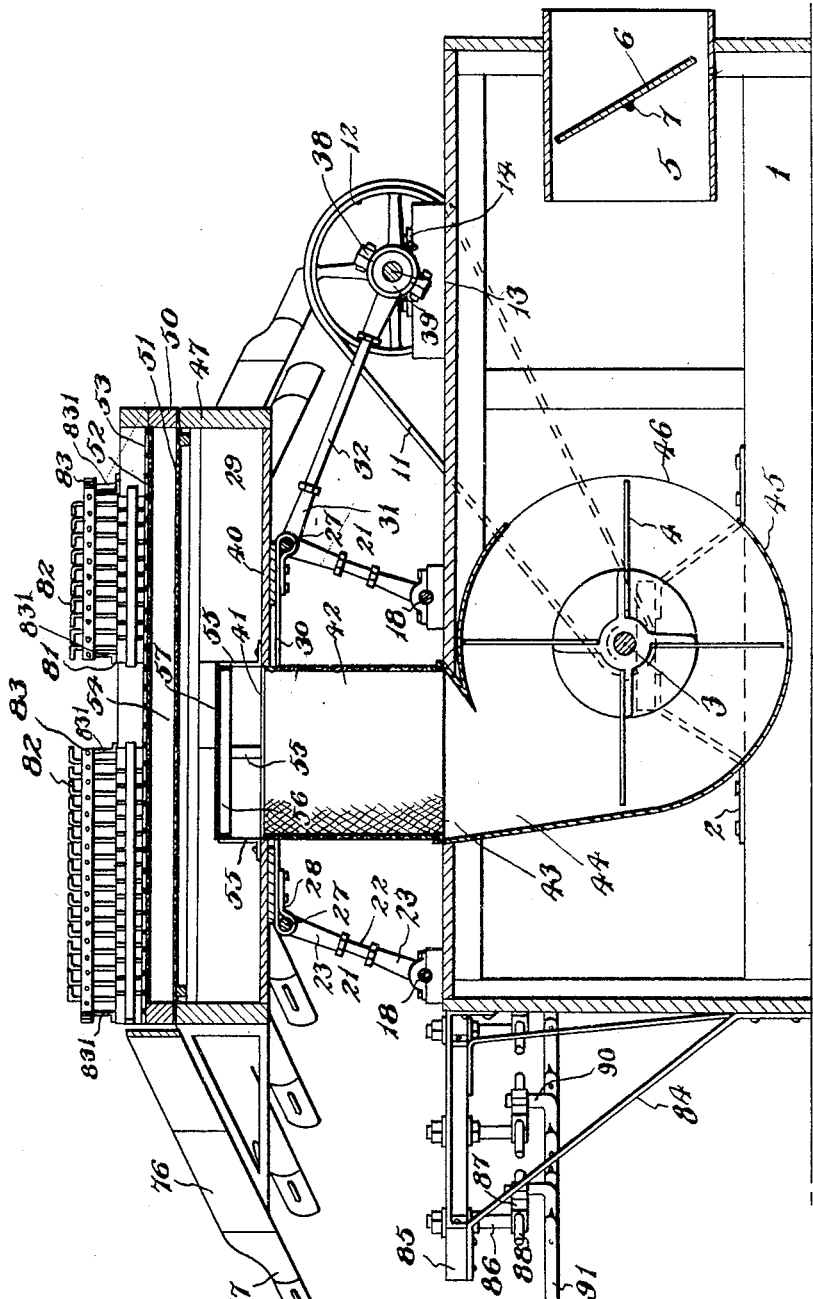

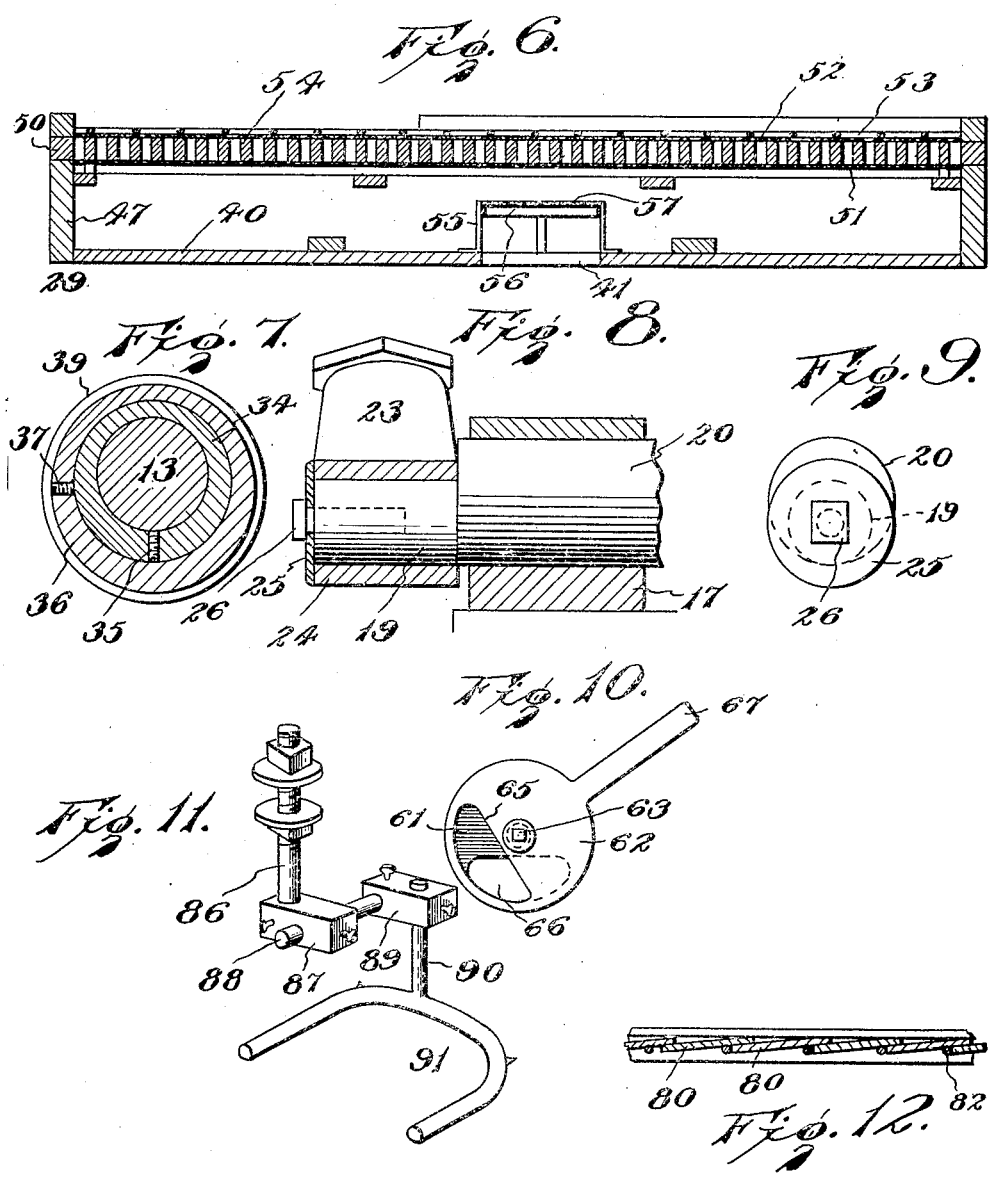

Patented Nov. 24, 1931

1,833,447

UNITED STATES PATENT OFFICE

FRANK O. TAYLOR, OF HOT SPRINGS, MONTANA

SEED CLEANER AND GRADER

Application filed January 12, 1929. Serial No. 331,971.

This invention has for its object the provision of an apparatus which will operate automatically to clean grain seeds and separate the same according to their size and quality and deliver them into separate receptacles according to their respective grades. The invention also provides means whereby the sand and other foreign matter will be eliminated from the seed and discharged at points other than the points of delivery of the seed. The invention also has for its object the provision of novel operating mechanism and a novel structure whereby an air blast will be caused to pass through the body of seed and aid in grading the same and eliminating foreign matter. The several stated objects of the invention, and other objects which will hereinafter incidentally appear, are attained in such an apparatus as is illustrated in the accompanying drawings, and the invention resides in certain novel features which will be hereinafter first fully described and then more particularly pointed out in the appended claims.

In the drawings:

Figure 1 is an end elevation of an apparatus embodying the invention,

Fig. 2 is an elevation viewing the machine from the end opposite that shown in Fig. 1, Fig. 3 is a rear elevation, Fig. 4 is a plan view, Fig. 5 is a transverse section on the line 5—5 of Figure 4, Fig. 6 is a longitudinal section of the seed deck, Fig. 7 is a detail section of a double eccentric embodied in the machine, Fig. 8 is a detail section of an eccentric bearing for a rocker arm, Fig. 9 is an end view of the bearing shown in Fig. 8, Fig. 10 is a detail view of the hopper spout valve, Fig. 11 is a detail perspective of a sack holder, Fig. 12 is a detail horizontal section through the spillway gates, and Fig. 13 is a detail of a seed delivery spout.

In carrying out the invention, there is provided a supporting frame which may be of any approved design having the requisite strength and durability, and this frame is preferably enclosed by a housing 1. Mounted within the housing 1 upon a bearing support, indicated at 2, is a fan shaft 3 carrying a rotary fan 4 which may be of any approved detail construction. At the rear side of the housing 1 is mounted an air inlet tube 5 having a damper or butterfly valve 6 mounted therein whereby the entrance of air into the housing may be regulated and said damper has its shaft or fulcrum 7 extended through one side wall of the housing and equipped at its outer end with a crank arm 8 to which is attached a handle or adjusting rod 9 which extends to the opposite side of the housing to permit the operator to readily set the valve in a desired position. The fan shaft is extended through one end wall of the housing 1 and equipped with a pulley 10, about which is trained a belt 11 passing rearwardly to be trained about a driving pulley 12 secured on the end of the driving shaft 13 which is mounted in suitable bearings 14 upon the rear portion of the housing and has secured thereon a driving pulley 16 whereby motion may be imparted to the driving shaft from any convenient source of power.

Mounted in suitable bearings 17 upon the top of the housing 1 and extending parallel with the driving shaft 13 are fulcrum rods 18 upon which are mounted the lower ends of rocker arms which support the seed deck and the parts carried thereby. As shown most clearly in Fig. 8, the end portions 19 of the fulcrum rods are eccentric to the intermediate portions 20 of the same and the rocker arms, indicated generally at 21, are fitted to and carried by the reduced eccentric portions 19. It will, therefore, be seen that, if the fulcrum rods be rotated in their respective bearings, the end eccentrics 19 will be set at a higher or lower point relative to the housing 1 and the seed deck, consequently, raised or lowered. This adjustment is advantageous at times inasmuch as the inclination of the seed deck may be thereby varied and nicely regulated according to the quality of the seed being treated. The rocking arms 21 are disposed at the ends of the fulcrum rods 18 and adjacent the front and rear sides of the housing and each rocking arm includes a central member or rod 22 having its ends oppositely threaded, and boxes or sleeves 23 engaged with the respective ends of the central rod. Each lower sleeve or box 23 has its lower end formed into a hub or collar, indicated at 24, which encircles the eccentric end 19 of the fulcrum rod and is held thereon by a cap plate 25, as shown. A retaining member 26 may be provided to prevent accidental removal of the cap plate from the eccentric, and this retaining member is formed with a flat-sided head so that it may be engaged by a turning tool to adjust the eccentric. Each upper sleeve or box 23 has its upper end formed into an eye encircling an upper fulcrum rod 27 which is similar in all respects to the fulcrum rod 18.

The upper fulcrum rods are fitted in strap bearings 28 secured to the under side of the seed deck 29, and these strap bearings may be formed by doubling the ends of metallic straps 30 which are secured against the under side of the deck, as shown in Figs. 1 and 2, the accurate spacing of the upper fulcrum rods being thereby assured. Pivotally engaged with the rear upper fulcrum rod 27 are boxes or sleeves 31 which are similar in form to the boxes or sleeves 23 and receive the ends of push rods 32 which extend rearwardly and have their rear ends engaged in sleeves 33 extending from split boxes 330 in which are fitted eccentrics mounted upon and actuated by the driving shaft 13. These eccentrics are shown most clearly in Fig. 7 and each comprises an inner eccentric sleeve or ring 34 which is secured to the shaft 13 in a set position by a set screw 35, and an outer eccentric sleeve or ring 36 which fits about the inner eccentric 34 and is secured to the latter in a set position by a set screw 37, the box 330 being constructed with mating securing lugs, indicated at 38, and fitting around the outer eccentric 36 between flanges 39 thereon so that the rotation of the shaft 13 will impart a reciprocatory motion to the push rods and thereby effect oscillation of the seed deck. It will be readily seen that by properly adjusting the eccentrics about the driving shaft the throw of the push rods may be very finely regulated.

The seed deck, identified as an entirety by the reference numeral 29, comprises a bottom plate 40 which is imperforate, except at approximately its center where it is formed with an opening 41 in which is secured the upper end of a canvas tube 42 which has its lower end secured to the top of the housing 1 about an outlet opening 43 therein. Said outlet opening 43 is coincident with the terminal of the spout 44 formed on the fan casing 45, and it will now be obvious that, when the fan is rotating, air will be drawn through the air inlet tube 5 to pass through the inlet opening 46 of the fan casing and be driven through the outlet 43 and the canvas tube 42 to act upon the seed deck. The tube 42 should be of sufficiently impervious material to prevent dissipation of the air blast while its flexibility will permit it to follow and conform to the oscillations of the seed deck. Side walls 47 rise from the bottom 40, and these side walls are so arranged as to provide an irregular figure, one end 48 of which is very narrow compared with the opposite end 49. Resting on the walls 47 and secured thereto in any convenient manner is a frame 50 having a screen 51 secured over its lower side and a similar screen 52 secured over its upper side, the frame 50 having, of course, the same outline in plan view as the figure defined by the walls 47. Over the screen 52 is placed a second coarse screen of wire 53, and between the two screens 51 and 52 are parallel slats 54 which form a support for the screens to prevent collapse of the same and also subdivide the air blast into a number of fine currents which will act directly upon the seed delivered onto the upper screen. Secured upon the bottom 40 of the seed deck and spaced about the opening 41 therein are brackets 55, at the upper ends of which is a hoop or ring 56 carrying a screen 57. The air blast emerging from the upper end of the tube or conduit 42 will spread under the screen 57 past the brackets 55 so as to flow to the entire interior of the seed deck, although the greater volume of the blast will impinge upon the screen 57. Said screen will, of course, at once divide the air blast into a number of very fine streams which will be in proper condition to act upon the seed on the upper screen. The screen 57 receiving the impact of the greater volume of the air blast will, of course, act as a retarder to prevent the blast flowing at once with full force against the central portion of the seed-carrying screen and this retarding and subdividing of the air blast will be augmented by the lower screen 51 of the frame 50. As a result of this dividing of the air blast, the moving air currents will be deflected so that they will reach the far corners of the seed deck and will flow upwardly through the screens of the same to act upon the entire body of seed delivered onto the deck and although the original velocity will have been checked there will still be force enough to accomplish the desired grading of the seed and the elimination of impurities.

The seed to be cleaned are placed in a hopper 58 located at a rear corner of the seed deck and supported upon standards 59 which are extensible, being constructed of upper and lower members connected by clamps 60, as shown and as will be readily understood. The hopper is provided with a depending delivery spout 61 projecting over the corner of the deck and equipped with a valve 62. The valve 62 is preferably in the form of a disk pivotally mounted upon a pin or bolt 63 projecting from the end wall of the spout 61 and supporting a spring 64 whereby the disk will be held close to the end wall of the spout. An opening 65 is formed in the disk having the same outline and area as the outlet 66 in the spout and a handle 67 projects from the edge of the disk so that it may be easily pivotally adjusted, as will be understood upon reference to Fig. 10, to regulate the effective area of the outlet and control the rate of discharge of the seed. As has been stated and as will be understood, the seed deck is constantly oscillated when the machine is in operation and the seed deposited upon the upper screens of the deck will, consequently, be agitated and will work over the deck away from the hopper and toward the remote end of the deck. The heavier and better quality seeds will be caught by the meshes of the uppermost coarse screen and will gradually work toward outlets or spillways on the front side of the deck, while the lighter seed will work toward similar spillways at the far end of the deck, the very light impurities working toward the back of the deck and passing off through spillways provided therefor. A sand pocket, indicated at 68, is provided adjacent the front of the seed deck and this pocket may be produced by crimping the upper screens 52 and 53 to form a groove or recess gradually increasing in depth toward the front and leading to an opening, indicated at 69, through the front wall 47 of the deck, the upper surfaces of the slats 54 being cut out or grooved to conform to the crimped portion of the screen. A sliding gate 71 is fitted over the opening 69 so that it may be opened as occasion may demand to permit discharge of the sand and heavy dirt which have been caught in the pocket 68. It will be understood, of course, that the sand and dirt are quite heavy compared with the seed so that the movement of the sand over the deck will be much slower and it will, therefore, be readily caught by the sand pocket.

Carried by and extending from the converging front and rear top walls of the seed deck are spillways 72 and 73 which are of similar form and comprise downwardly and outwardly converging end walls 74, as shown, brackets 75 being secured to the walls of the deck and to the bottoms of the spillways to reinforce the same and prevent collapse of the spillways and their detachment from the deck. The front spillway 72 leads into a series of four hoppers or pockets 76 of a general triangular form and each equipped with a discharge spout 77 having a damper or valve 78 in its outer extremity, as shown in Fig. 13. The rear spillway 73 leads into similar pockets 79 of which two are provided. Mounted in the upper walls of the seed deck and extending from end to end of the respective spillways are gates 80 which form a continuous barrier or closure for the entrance to the spillway, each gate having an edge portion 81 overlapping the adjacent edge of an adjacent gate, as shown clearly in Fig. 12. Each gate is equipped with a handle member 82 rising therefrom so that the gates may be independently lifted and thereby set to permit discharge of the seed or other matter. The several handles pass between clamping bars 83 which serve as friction means to maintain the gates in their adjusted positions, and are carried by brackets 831 secured upon the wall of the deck.

Brackets 84 of any approved form are secured to the front and rear walls of the housing 1 and support a bar or rack 85 which extends below the several spillway pockets, as shown. Mounted vertically in each bar or rack 85 are supporting bolts or rods 86 having clamping blocks 87 adjustably secured upon their lower ends. Cross rods 88 are secured in the blocks 87 and project rearwardly therefrom and have clamping blocks 89 adjustably secured upon their rear ends. In the blocks 89 are adjustably secured the upper ends of vertical stems 90 which carry sack-holding arms 91 at their lower ends. A sack holder 91 is arranged below each spout 77 so that a sack may be supported below the spout with its mouth open to receive the seed discharged from the spout.

The seed deck constitutes a separating table and is elongated and of trapezoidal outline and arranged with its major length at a right angle to the gigging motion imparted thereto when the machine is in action. This table inclines longitudinally and laterally, the receiving end being higher and of greater width than the delivery end and the rear side being slightly higher than the forward side. The table is of maximum width intermediate its ends and tapers toward opposite ends. The forward side is straight and the rear side is reversely inclined from an intermediate point.

In practice, a gigging motion is imparted to the table in the direction of its width which causes it to rise and fall and to reciprocate. This effects a separation of the grain which is assisted by the ascending currents of air. The upper coarse screen 53 prevents a too rapid movement of the material fed to the table from the hopper 58. The gigging motion prevents lodging of the material in the meshes of the screen 53 and effects the separation and positive movement of the grain over the table. The sand and analogous heavy particles move across the receiving end of the table until arrested by the inclined portion of the rear wall along which they travel and discharge into the pocket 68. The grain moves toward the rear side and delivery end of the table until arrested by the reversely inclined portion of the rear wall along which it travels and discharges into the spillway 72 and hoppers 76. The heaviest grain is received in the hopper 76 nearest the receiving end of the table, the next hopper receives the grain not quite so heavy, the grain separating and discharging into the hoppers according to the proportionate weight thereof. The chaff and light material discharge into the spillway 73 and pass into the hoppers 79.

From the foregoing description, taken in connection with the accompanying drawings, it will be seen that I have provided a very efficient machine whereby seed deposited upon the seed deck will be automatically separated and cleaned and delivered in sacks according to their several grades.

Having thus described the invention, I claim:

1. A separating table comprising a bottom and enclosing side walls, the bottom having a central opening, a screen supported over and spaced from the opening, upper and lower spaced screens extending between the side walls near the top thereof, parallel slats bridging the walls between the spaced screens, and a coarse screen resting upon the upper screen.

2. A separating table for grain having a portion of its rear wall disposed obliquely relative to the adjacent end wall, and upper and lower screens extending over the entire area of the table, the upper screen having a portion crimped to form a pocket adjacent the obliquely disposed wall for reception of sand and heavy particles separated from the grain, and said wall having an opening therethrough constituting an outlet for the pocket.

3. A separating table for grain having its rear wall consisting of outwardly converging portions and having an opening therethrough adjacent the receiving end, screens extending over the entire area of the table, an upper screen having a crimped portion adjacent the receiving end forming a pocket alined with the opening through the wall, spillways leading laterally from said wall along the delivery end portion of the table, and valved discharge spouts leading from the spillways.

4. A separating table for grain having its forward wall and the wall at its receiving end straight and its rear wall formed with outwardly converging portions, one of said portions also converging to the delivery end of the forward wall, screens extending over the entire area of the table and having a portion crimped to form a pocket with an outlet through the rear wall adjacent the receiving end wall, and spillways leading laterally from the converging delivery end portions of the forward and rear walls.

In testimony whereof I affix my signature

FRANK O. TAYLOR. [L. S.]